May 2, 1939.  W. E. SYKES  2,156,884
APPARATUS FOR HARDENING METALLIC BODIES BY
THE LOCAL APPLICATION OF HEAT
Filed Feb. 27, 1937  4 Sheets-Sheet 1

INVENTOR
William E. Sykes
BY
ATTORNEY

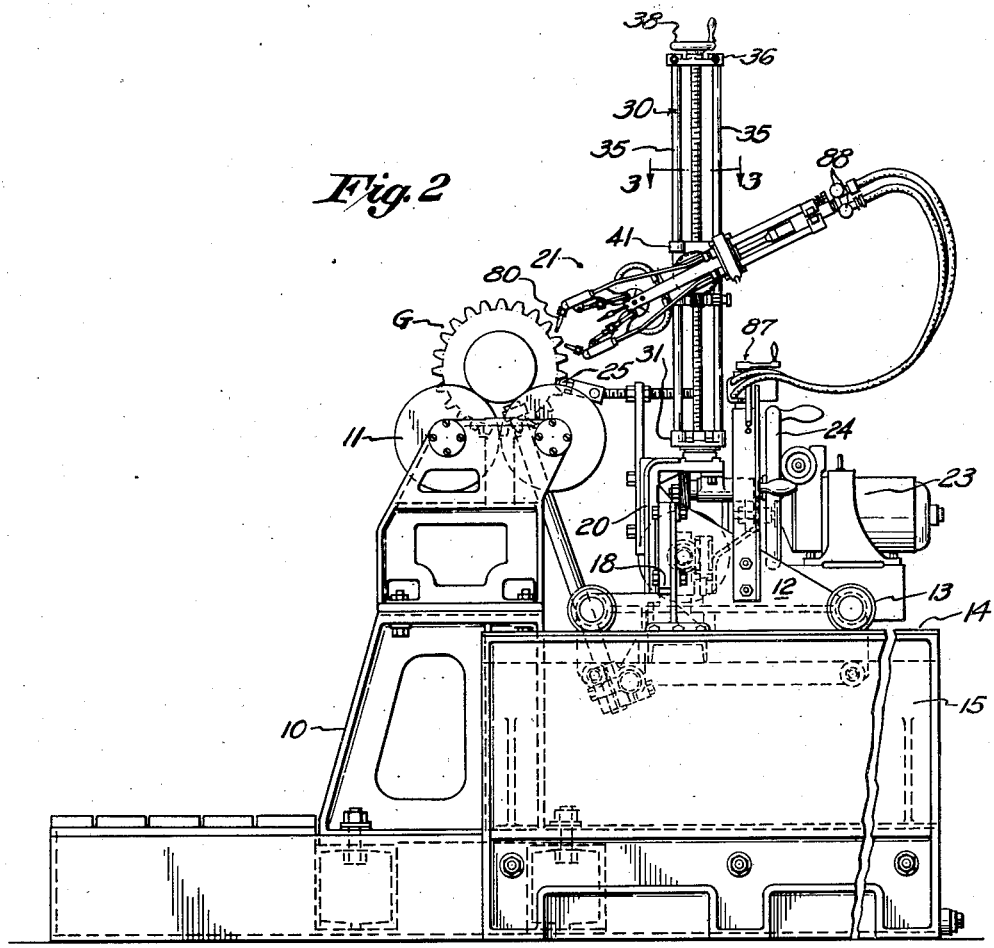

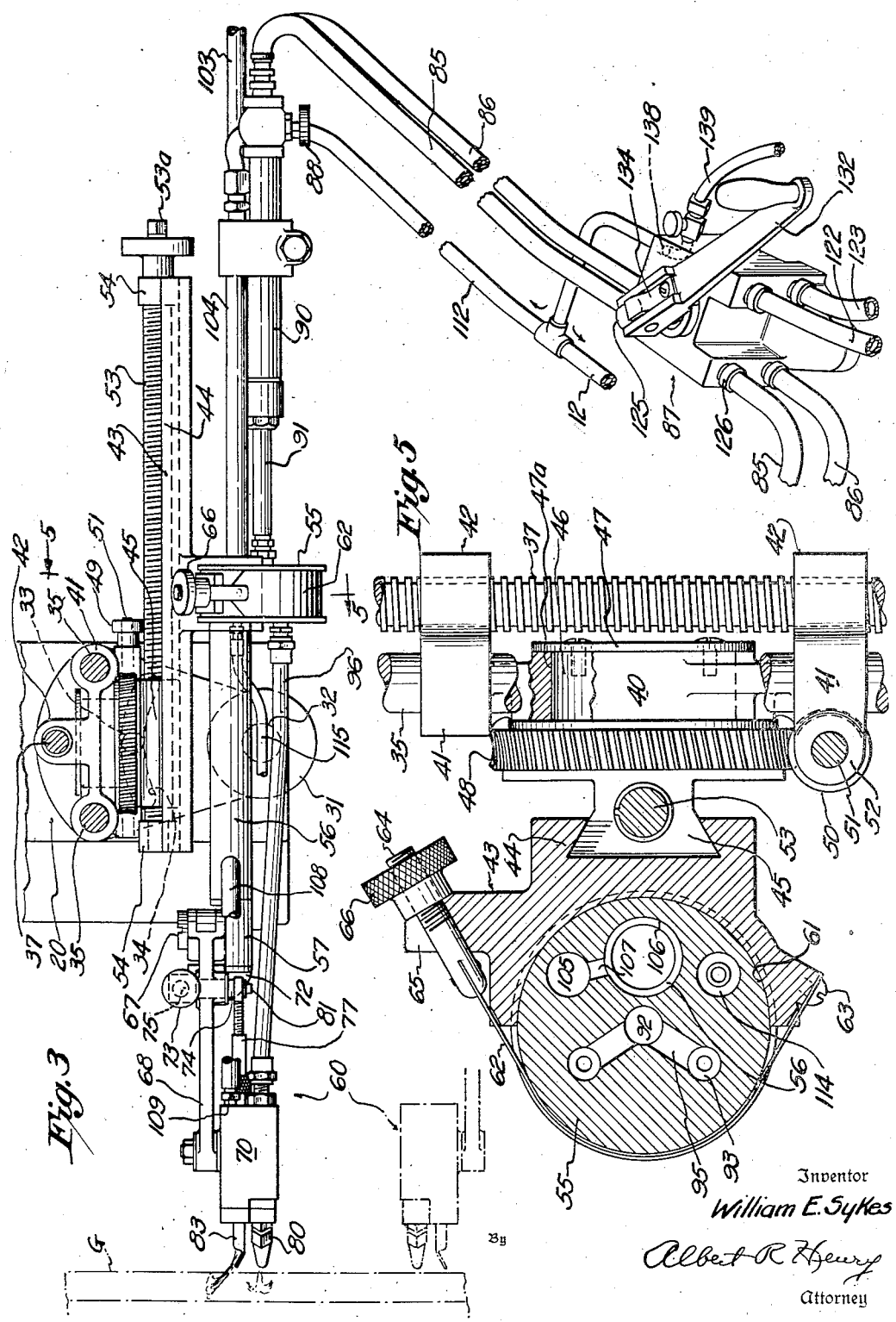

May 2, 1939. W. E. SYKES 2,156,884
APPARATUS FOR HARDENING METALLIC BODIES BY
THE LOCAL APPLICATION OF HEAT
Filed Feb. 27, 1937 4 Sheets-Sheet 4
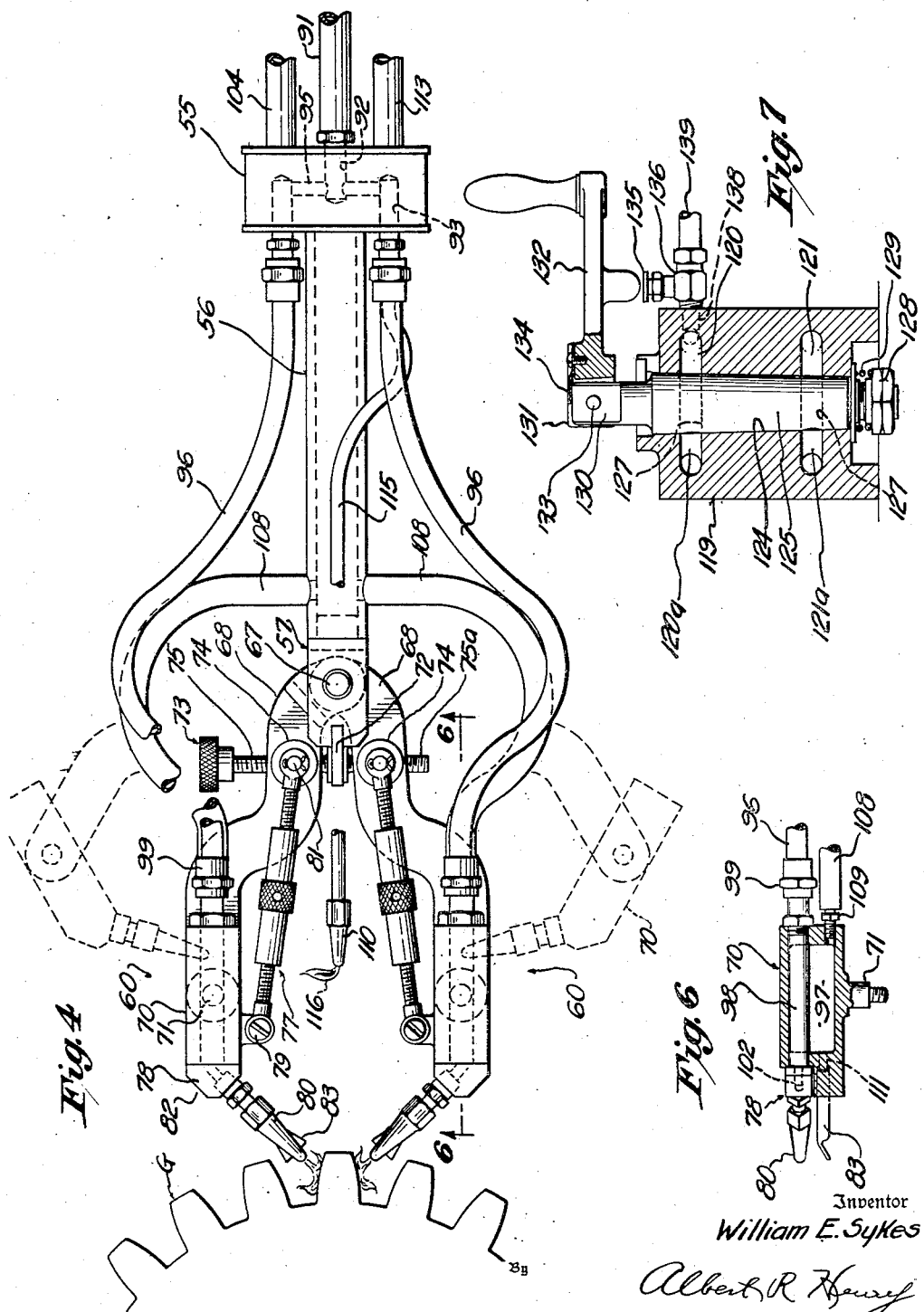
Inventor
William E. Sykes
Albert R. Henry
Attorney Patented May 2, 1939

2,156,884

UNITED STATES PATENT OFFICE 2,156,884

APPARATUS FOR HARDENING METALLIC BODIES BY THE LOCAL APPLICATION OF HEAT

William E. Sykes, Buffalo, N. Y.

Application February 27, 1937, Serial No. 128,238

15 Claims. (Cl. 266—4)

This invention relates to the surface hardening of metallic bodies, such, for example, as the teeth of a steel gear, by the local application of intense heat, and it deals particularly with the provision of improved torch means for readily effecting the desired heat treatment.

When an ordinary iron or steel body is heated to a high temperature and quickly cooled, the structure of the metal undergoing such treatment is changed and converted to a very hard form. In many industrial uses, it is desired to take advantage of the characteristics of such hard form of metal, but numerous circumstances combine to make the heat treatment of the entire body a practical impossibility. Accordingly, it has been proposed to harden only the surface of the body by playing a blow torch thereon, thus raising the temperature to the desired point, and then quickly cooling the heated surface by a spray of water or other suitable quenching medium. Such procedure is termed torch hardening, and the primary purpose of the present invention is to provide means whereby this process may be more effectively conducted.

The effectiveness of the results obtained by torch hardening is governed, to a large extent, by the uniformity with which each surface element is treated. Care must be exercised, if consistent and predictable results are to be obtained, in governing the depth to which the heat penetrates and the time which the heat is applied. In order to insure satisfactory practical operation, it is therefore advantageous to provide not only a suitable torch, or heating element, but also some means for holding and guiding the torch as it moves relative to the surface undergoing treatment.

In my prior United States Letters Patent No. 2,067,549, patented January 12, 1937, I have described a suitable machine for conducting a torch hardening process on the teeth of gears, particularly those of the helical type. Such machine comprises a frame on which is mounted a movable carriage adapted to traverse the face of the gear and to carry a torch member projecting a hot flame onto the gear teeth, and means to rotate the gear so that the successive surface elements thereof are brought into the zone of the flame as the torch is moved.

According to the present invention, it is proposed to provide an improved torch structure, capable of ready adjustment to adapt the apparatus to the treatment of a wide variety of types and sizes of gear teeth or other metallic surfaces. The present invention may be readily applied to machines of the type described in my prior patent, and will therefore so be described here, but it is to be understood that the present invention is not limited to use in connection with the patented machine, nor to the treatment of helical gear teeth.

The various novel features of the invention, and the advantages to be derived from the use thereof, will be more apparent from a perusal of the following detailed description of a specific embodiment, illustrated in the accompanying drawings, wherein:

Fig. 2 is a side elevation of the machine, with a gear to be treated mounted therein, and with the left hand torch of Fig. 1 omitted;

Fig. 3 is an enlarged section on the line 3—3 of Fig. 2, with the torch body disposed in a horizontal plane;

Fig. 4 is an enlarged front elevation of the torch body;

Fig. 5 is an enlarged section on the line 5—5 of Fig. 3;

Fig. 6 is a section on the line 6—6 of Fig. 4, showing the internal structure of a tip carrier; and, Fig. 7 is a cross section through the control valve shown in Fig. 3, with the valve stem disposed in open position.

Figure 1:
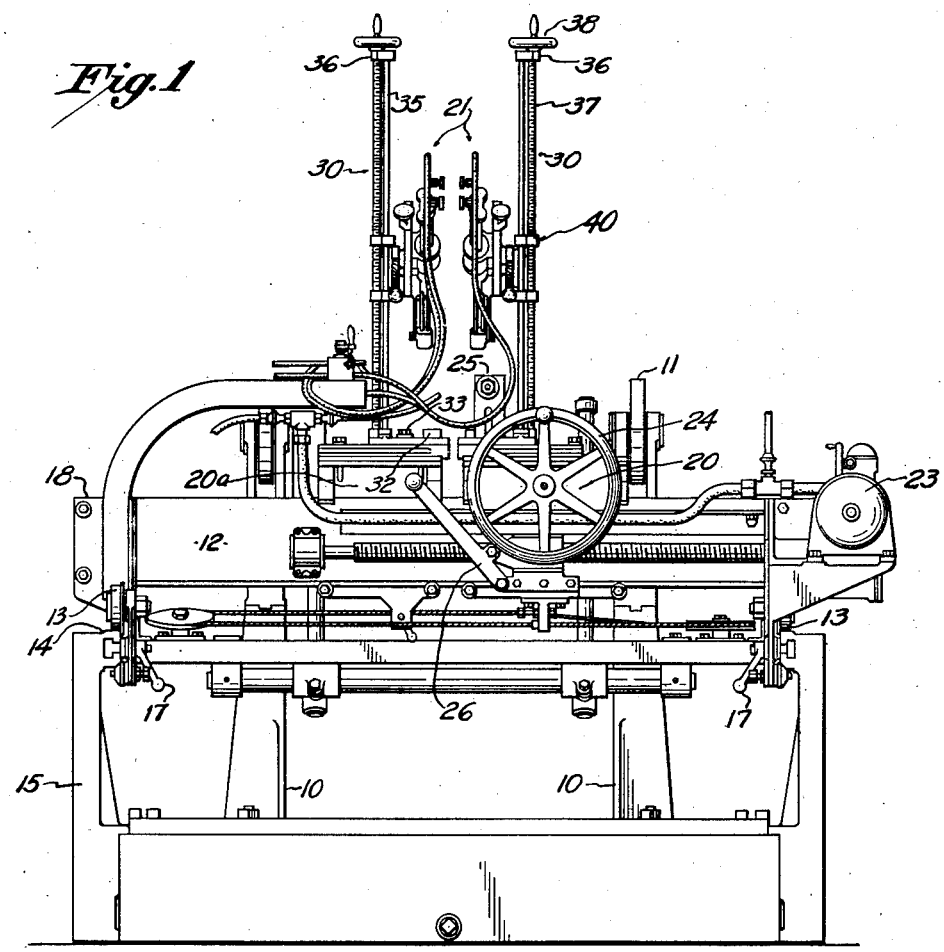
Fig. 1 is a front elevation of a hardening machine incorporating the torches of the present invention.

The machine illustrated in Figs. 1 and 2 is of the same type as that described in my prior Patent No. 2,067,549, and hence it is assumed that only a summary description is required here. The machine includes a pair of relatively fixed pedestals 10 having rollers 11 upon which may be mounted a gear G or other work which is to be heat treated. Disposed in front of the pedestal 10 is a carriage 12 which carries the heat treating equipment. This carriage is mounted on rollers 13 which bear on elevated tracks 14 formed on the machine frame 15, so that the carriage may be moved along the rails and adjusted with respect to the face of the work. Suitable locking devices 17 are provided to lock the carriage 12 to the rails after the desired adjustment has been effected.

The carriage 12 is formed with transverse upper and lower slides 18, upon which are slidably mounted a pair of saddles 20 and 20a. Each saddle carries a torch, generally designated by the reference numeral 21, which is formed with opposed nozzles or tips 80, adapted to straddle a tooth of the gear G, and to direct the hardening flames on the surface thereof. As more fully described in my prior patent, the saddles are moved toward and away from each other at a uniform speed by a suitable driving mechanism 23, thus causing the torches to reciprocate across the face of the gear. During the converging movement of the saddles toward the central plane of the gear, the torches are ignited, and the tooth portions traversed by the flames are uniformly heated and quenched to effect the desired hardening.

The machine herein illustrated is provided with a hand wheel 24 for manual operation of the saddles 20 and 20a when the power drive 23 is not utilized, and with a lock lever 26 for effecting the engagement or disengagement of one saddle 20a when the employment of only one torch 21 is indicated. Since the mechanical details of these means are not of the essence of the present invention, and may readily be supplied by a skilled mechanic, particularly in the light of my prior patent, further description of such parts of the illustrated machine is therefore believed unnecessary in this specification.

One of the saddles is provided with a projecting indexing finger 25, which in sliding between the adjacent teeth of the gear serves to insure the accurate positioning of the tips 80 of the torch during the traversing action. In hardening gears having helical teeth, the finger actively engages the curved teeth and thus slowly rotates the gear while it traverses the face thereof. Inasmuch as the torch is also carried by the saddle and is fixed relative to the finger 25, it is necessarily maintained in proper straddling position over the tooth which is being treated. When single helical gears are hardened, only the saddle 20 is utilized, while in treating double helical gears or the like, the second saddle is brought into service, as illustrated.

The saddles 20 and 20a each carry a torch supporting standard 30 which includes a base 31 secured to the top of each saddle by a pivot stud 32 and a securing stud 33, the latter being disposed in an arcuate slot 34 (Fig. 3). The base serves as a support for a frame structure consisting of vertically extending guide rods 35 whose opposite extremities are rigidly secured in the base 31 and in a yoke 36. An adjusting screw 37 is rotatably mounted at its opposite extremities in the base and yoke respectively, and it protrudes through the latter member and receives a hand wheel 38. A block 40 is formed with spaced bearings 41 which slidably engage the rods 35, and the block is also formed with tapped bosses 42 for receiving the adjusting screw 37.

A torch carriage 43 is formed with elongated slide bearings 44 which engage a slide 45 for adjustable movement, as hereinafter described. The slide 45 is formed with a projecting hub 46 which is rotatably supported in a horizontal bearing 47a formed in the block 40. A thrust plate 47 secured to the face of the hub 46 prevents axial movement of the hub in the block. The slide is also formed with a worm wheel portion 48 which meshes with a worm 50 whose shaft 51 is mounted in bearings 52 in the block 40. A knob 49 is secured to the shaft 51 and it is operable to rotate the worm wheel and slide 45 about a horizontal axis, and thus serves as an inclinatory adjustment for the attached torch carriage 43 and the torch 21 which is carried thereby.

To provide lineal adjustment of the torch toward or away from the gear, the slide 45 of the block structure 40 is tapped to receive an adjusting screw 53 which is mounted in bearings 54 located at the ends of the slide bearings 44 of the torch carriage 43. The screw is formed with a projecting head 53a which may be engaged to turn the screw and thus move the carriage along the slide 45.

The body of the torch 21 is fabricated of a flanged mounting drum 55, a pipe 56 connected to the drum at one extremity and at the remaining end carrying a plug fitting 57, and a pair of torch elements 60 pivotally connected to the fitting 57 in a manner which will presently be described. The drum 55 serves to support the structure by engaging in a semi-cylindrical socket or bearing 61 which is formed in the torch carriage 43. A flexible band 62 serves to retain the drum in the socket, one end thereof being secured to the carriage by a screw 63, and the remaining end being fastened to a screw 64. The screw 64 is disposed between lugs 65 on the carriage and it may be pulled up by a thumb screw 66 to strain the band and thus lock the torch against rotation, or, if rotary adjustment of the torch is desired, the band may be readily loosened.

Referring now to the structure of the torch elements 60 (Figs. 3 and 4), it will be observed that the plug fitting 57 receives a pivot stud 67 which projects through the ends of a pair of links 68. The remaining ends of the links are each pivotally secured to tip carriers 70 by stud portions 71 formed thereon. The fitting 57 is also formed with a projecting bearing portion 72 in which the central portion of an adjusting screw 73 is rotatably mounted. Pivot studs 74 are mounted in suitable bearings in the links 68, and their projecting portions are tapped to receive the oppositely threaded shanks 75 and 75a of the screw 73.

Rotary adjustment of each tip carrier 70 on its supporting link is effected by a turnbuckle 77, one eye of which is pivotally connected to the carrier by a stud 79, with the remaining eye engaged over a shouldered projection 81 on the pivot stud 74.

The tip carriers 70 are each formed at their forward extremity with an angular face 82, into which is fitted a water nozzle 83 and a transversely aligned insert member 78 having a similar angular face into which a torch tip 80 is inserted.

The various adjustable structures of the torch units 21 are devised to make the machine more readily operable on gears of various types and sizes. The use of the machine is not necessarily limited to gears, as it will be obvious that other types of toothed wheels, such as cutters, ratchet wheels, and the like, may be hardened with equal facility. As above described, each entire torch unit may be rotated about a vertical axis on the pivot stud 32 of the torch supporting standard 30, and, as viewed in Fig. 3, the torch body may thus be moved from its transverse or normal position relative to the axis of the gear to any desired angular position. It will be observed that the axis of the torch body and drum 55 is intersected by a perpendicular drawn from the main pivot stud 32. Thus, upon angular adjustment of the unit about the vertical axis, the torch extremities will swing through a circular arc whose center lies in the perpendicular axis.

It will be observed from Figs. 3 and 5 that a line drawn from the center of the adjusting screw 37 through the center of the stud 32 also passes through the center of the worm 48, which is, of course, concentric with the hub 46. Hence, the vertical axis taken through the stud 32 is intersected by the horizontal axis taken through the hub 46, and these lines are, in the positions shown, at right angles to each other. Similarly, it will be observed that the longitudinal axis taken along the torch and drum 55 is, when the torch is in a horizontal position, also perpendicular to the vertical axis, and intersects such axis at the point defined by the intersection of the vertical and horizontal axes. There are thus determined three rectilinear coordinates or axes having a common point of intersection, about which point, as a center, the torch and its tips may be adjusted with respect to any of the three planes of reference defined by such coordinates.

It may also be noted here that the tips 80 of the torch normally lie in a common plane, which plane includes the horizontal axis of the torch body taken through the common point just referred to. Hence, whether a rotary adjustment be effected about the stud 32, the hub 46, or by rotation of the drum 55 itself, or any combination of such adjustments be made, each and all of the adjustments will be taken about a common center, and the making of one adjustment therefore does not introduce any eccentricity in any other adjustment which may be made.

In adjusting the torch into operative position with the gear teeth, its supporting carriage 43 is first raised, by operation of the adjusting screw 37, to the proper elevation as dictated by the diameter of the gear, whereupon the torch body is then positioned radially with respect to the axis of the gear by the inclinatory adjustment afforded by the worm wheel and worm mechanism of the carriage 43, which is operated by the knob 49. The torch carriage and accompanying torch may then be moved lineally toward the gear along the slide 45 of the carriage supporting block 40, until the torch tips 80 are disposed in straddling relation upon a tooth of the gear. Proper spacing of the tips 80 is obtained by adjustment of the links 68 through manipulation of the screw 73. It will be observed that tip carriers 70, which are supported by the links 68, are normally symmetrically disposed about the axis of the torch body, with the tips 80 angularly directing their flames on opposite sides of the tooth. As shown in dotted lines in Fig. 4, the jaws and accompanying tip carriers may be opened to accommodate teeth of the largest size. When asymmetrical tooth forms are being hardened, the tip spacing from the theoretical axis of the torch body may be made non-uniform by adjustment of one of the turnbuckles 77. The turnbuckle adjustment may also be utilized to vary the angle of application of the flame to the sides of the teeth so that in some cases a nearly direct impingement of the flames on the tooth face may be obtained.

In the hardening of straight teeth, the opposed tips 80 of the torch are disposed in vertical alignment, while in use on helical teeth the tips are aligned transversely of the helical angle of the teeth. This last phase of adjustment is obtained by rotating the supporting drum 55 in the carriage socket 61. By this means all types of helical teeth and formations may be accommodated.

The gas and water circuits leading to the tips 80 and to the water nozzles 83 will now be described. Referring to Fig. 3, it will be observed that flexible supply pipes 85 and 86, containing oxygen and acetylene or other combustible gases, lead from a control valve 87 to mixing or proportioning valves 88 fitted to a mixing cylinder 90. A pipe 91 leads from the mixing cylinder and it is connected in a central orifice 92 in the right hand side of the mounting drum 55. Tapped holes 93 entering the other side of the drum communicate with the orifice 92 through radial passages 95, and they communicate with pipes 96 each leading to a tip carrier 70. As shown in Fig. 6, each carrier 70 contains an enclosed cooling chamber 97. A pipe 98, forming part of the insert member 78, projects through the chamber and it is connected with the pipe 96 by a fitting 99. A drilled passage 102 in the member 78 affords communication between the pipe 98 and the tip 80.

A flexible water supply pipe 103 is connected to a pipe 104, which is secured in an opening 105 in the drum 55. The previously described pipe 56, which forms part of the structure of the torch, is fitted in an opening 106 in the drum, and it receives a water supply from the opening 105 through a connecting passage 107. Flexible conduits 108 enter the large pipe 56, and they communicate with fittings 109 which communicate with the chambers 97. Drilled outlet passages 111 in the carriers supply the water nozzles 83 (Fig. 6). By this jacket arrangement the torch body and the tip carriers are cooled by the water supplied for the nozzles 83.

A second and separate gas supply is provided for a pilot tip 110 through a flexible conduit 112, leading from the control valve 87 to a pipe 113, which is secured in a tapped hole 114 in the drum 55. A tube 115 leading from the hole 114 is connected to the tip 110. The tip 110 is positioned along the axis of the torch, and it ordinarily is supplied with a small quantity of combustible gas to maintain a pilot flame 116. When it is desired to ignite the torch gases from the tips 80, a valve associated with the control valve 87, and hereinafter described, permits a sharp jet to be momentarily directed from the tip 110 into the path of the gas from the tips 80.

The control valve 87, as shown in Figs. 3 and 7, comprises a body 119 which is formed with passages 120 and 121 for the torch gases, which passages are connected to main supply conduits 122 and 123 leading to suitable sources of supply. The passages terminate in a vertical bore 124, wherein a tapered valve stem 125 is rotatably mounted. Passages 120a and 121a enter diametrically opposed portions of the bore 124, and the flexible conduits 85, 86 for both torches communicate therewith through connecting fittings 126.

The valve stem 125 is formed with diametral ports 127 which, when the stem is rotated to the position shown in Fig. 7, establish communication between the supply passages 120, 121 and passages 120a, 121a, respectively, and thus permit gas under pressure to be supplied to the torches. The lower end of the stem is threaded to receive nuts 128 which adjustably engage a spring 129 disposed on the body 119. The spring serves to retain the tapered stem 125 in gas-tight engagement with the bore 124.

The upper end of the stem 125 is formed with a flattened portion 130 which is received in the slotted hub 131 of an operating lever 132. A pin 133 extends through both the portion 130 and hub 131, and provides a pivotal mounting for the lever. A flat spring 134 secured to the hub 131 engages the top of the stem 125 and thus releasably retains the lever in a horizontal position.

When the lever 132 and accompanying stem are swung from the closed port position (Fig. 3) to the open position (Fig. 7) to render the torches operative, the shank of the handle is disposed directly over a valve button 135 of a pilot gas valve 136, and the handle may be momentarily depressed against the force of the spring 134 to operate the valve 136, and thus cause the described jet igniting action of the gas flame of the tip 110. The valve 136 is conveniently attached to a passage 138 in the body of the control valve 87 which leads to the flexible conduit 112. The outer end of the valve is connected to a gas supply conduit 139.

In operation, the gear G or other work which is to be surface hardened is positioned on the rollers 11, and the carriage 12 is moved along the rails 14 to effect an initial adjustment of the torches adjacent the work. The torches themselves are then adjusted to whatever extent may be required in order to bring the tips 80 up to the work surface. These adjustments, as noted above, may include vertical elevation of the entire torch body by operation of the hand wheel 38, inclinatory adjustment by rotation of the worm 50 and meshing wheel 48, in-feed adjustment by means of the screw 53, rotational adjustment about the pivot point 32, and rotational adjustment in a different plane by manipulation of the body 55 in the strap 62. Adjustment or movement of the torch along the face of the work is of course effected by movement of the saddles 20 and 20a.

In addition to these features of adjustability, which are utilized as desired to bring the torch tips 80 into proper position with respect to the work as a whole, the tips themselves are susceptible of independent adjustment as to spacing, by movement of the thumb screw 73, and inclination towards the work by actuation of the turnbuckles 77. This articulation of the torch tips therefore permits of the widest possible variety of adjustments, so that no matter what the shape or size of the work may be (within the dimensional limits of the apparatus) it can be assumed that correct positioning of the flames against the work surface may be obtained.

When the apparatus is properly located, the pilot flame 116 is ignited, and, as the operator swings the handle 132 to admit gas to the tips 80, he momentarily depresses the handle to open the pilot valve 136, thus shooting the flame 116 down to the tips to ignite the gases emerging therefrom. Release of the handle 132 effects the partial extinction of the jet flame 116, thus avoiding any interference with the heat treating operation which might otherwise occur.

It will of course be understood that the torch apparatus herein described may be applied to machines other than the type described in my prior patent, and that the invention is susceptible of numerous modifications and variations without departure from its principles. Accordingly, it is intended that the foregoing description should be regarded as illustrative of the various forms and adaptations of the invention, as defined in the following claims.

I claim:

1. Torch hardening apparatus comprising a standard, a slide member, means connecting the slide member to the standard, a torch carriage mounted for lineal movement along said slide member, a semi-cylindrical socket formed in said carriage, a torch having a cylindrical body portion rotatably mounted in the socket, and a flexible band secured to the carriage and disposed about the protruding portion of the body portion to retain it in said socket.

2. Torch hardening apparatus comprising a torch having a flame directing nozzle thereon, conduit means communicating with the torch for supplying gas thereto, a valve control interposed in the conduit means and including a valve control lever, a pilot burner having a tip portion directed toward said first nozzle, conduit means for supplying combustible gas to the burner, a valve interposed in said last conduit means and including a depressible stem portion, said last valve being mounted adjacent said first valve with its stem portion disposed adjacent the control lever when the lever has been operated to open the first valve, said lever being further movable to depress the stem portion and thereby to cause the flame of the pilot burner to be impinged in the path of the escaping gases of the torch nozzle.

3. Torch hardening apparatus comprising a torch having a pair of spaced nozzles thereon, conduit means communicating with the torch for supplying gas thereto, a valve control interposed in the conduit and including a rotary valve stem and a control lever pivotally secured to the stem, a pilot burner having a tip portion directed toward the focal point of the nozzles, conduit means for supplying gas to the burner, a valve interposed in said last conduit means and including a depressible stem portion, said last valve being mounted with its stem portion immediately beneath said control lever when the lever has been operated to open the first valve, said lever being depressible about the pivotal mounting thereof to engage and depress the stem portion, thereby to cause the flame of the pilot burner to be impinged on the focal point of the escaping gases of the torch nozzles.

4. Torch hardening apparatus comprising a body including a hollow tubular member, a water conduit connected to said member at one end thereof, a pair of divergent links pivotally connected to said member at its opposite end, hollow tip members pivotally connected to said links, means associated with said links and tip members for varying the inclination and spacing of the tip members with respect to each other, connecting conduits communicating between said tubular member and said tip members to supply water from said tubular member through said tip members, torch tips on said tip members, gas conduits connected to said tips, a pilot gas tip mounted on said torch body in spaced relation to said tips, valve means for controlling the flow of gas to said tips, and means associated with said valve means for momentarily supplying large quantities of gas to said pilot tip to eject a flame therefrom to said torch tips.

5. Torch hardening apparatus comprising a torch body formed at one end with a pair of spaced tips, means for varying the spacing and inclination of the tips with respect to each other, a mounting member for said body, and means for mounting said body on said member for adjustment about three axes disposed in different planes and intersecting in a common point.

6. Torch hardening apparatus comprising a torch body formed at one end with a pair of spaced tips lying in a common plane, means for varying the spacing and inclination of said tips with respect to each other in said plane, a mounting member for said body, and means for mounting said body on said members for adjustment in three different planes including the plane passing through said tips and about a point determined by the intersection of three rectangular coordinates.

7. Torch hardening apparatus comprising a saddle, a standard perpendicularly disposed on the saddle, means securing the standard to the saddle including a pivot member, a block member attached to the standard and formed with a horizontal bearing, a slide member having a portion rotatably carried in the bearing, the axis of said portion intersecting and being perpendicular to a vertical axis taken through said pivot member, manually operable adjustment means for rotatably positioning the slide member about the axis of said portion in the block member, a torch carriage mounted for lineal movement along the slide, and a torch secured to the carriage, said torch being formed with tips lying in a plane passing through the point of intersection of said axes.

8. Torch hardening apparatus comprising a saddle, a standard perpendicularly disposed on the saddle and mounted for pivotal movement in a horizontal plane about a vertical axis thereon, a block secured to the standard and having a horizontal bearing whose axis intersects said vertical axis, a slide member having a portion mounted in the bearing, a torch carriage mounted for lineal adjustment on the slide member along a line parallel to a line passing through the point of intersection of said axes, and a torch having a body portion rotatably mounted about said line on said carriage, said body portion being disposed on the carriage in a position above said horizontal plane of rotation.

9. Torch hardening apparatus comprising a saddle, a standard perpendicularly disposed on the saddle and mounted for pivotal movement about a pivot point disposed in a horizontal plane thereon, torch supporting means on the standard formed with a bearing portion whose axis is intersected by a vertical axis taken through the pivot point of the standard, a torch having an elongated body formed with an axial cylindrical portion rotatably carried in said bearing portion for rotation in two planes about a line passing through the point of intersection of said axes, and angularly disposed tips mounted on one extremity of the torch body, said tips being positioned to direct gas jets to a focal point lying in the axis of the torch body.

10. Torch hardening apparatus comprising a saddle, a base pivotally mounted on said saddle for rotation about a vertical axis, standards mounted on the base and extending thereabove, a block slidably mounted between the standards, means connecting the standards and block to effect adjustable movement of the block along the standards, said block being formed with a bearing having a horizontally disposed axis intersecting said vertical axis, a torch carrier mounted in the bearing, means extending between the block and carrier to effect the rotary adjustment of the carrier about said horizontal axis, said carrier being formed with a cylindrical socket adapted to receive said torch, the center of said socket lying at the point of intersection of said horizontal and vertical axes.

11. Torch hardening apparatus comprising a saddle, a base pivotally mounted on said saddle for rotation in a horizontal plane about a vertical axis, upright standards mounted on the base, a block disposed between said standards, means connecting the block and standards for effecting the vertical adjustment of the block along the standards, a bearing having a horizontally disposed axis intersecting said vertical axis formed in the block, a hub member rotatably mounted in the bearing, means connecting the hub and block for adjustably rotating said hub about said horizontal axis, a slide extending from said hub, a torch carrier lineally movable along said slide, an elongated torch mounted on said carrier, said torch being formed at one extremity with spaced tips lying in a common plane disposed longitudinally of the torch, said torch being so disposed on said carrier as to locate said plane through the point of intersection of said axes.

12. Torch hardening apparatus comprising an upright standard, means for mounting said standard for pivotal movement in a horizontal plane about a vertical axis, a lineally adjustable block mounted on the standard, a torch carrier mounted in said block for inclinatory rotary adjustment about a horizontal axis disposed perpendicular to and intersecting said vertical axis, means for moving said carrier lineally with respect to said axes along a line parallel to a line passing through the point of intersection of said axes and perpendicular to at least one of them, a torch having a pair of spaced tips lying in a common plane, means for mounting said torch on said carrier in such position that said plane includes said line passing through said point, said last named mounting means being adjustable whereby the angle between said plane and said horizontal axis may be varied.

13. Torch hardening apparatus comprising a torch body, said body being formed adjacent one end with a cylindrical drum, a pair of links pivotally mounted on said body at the opposite end thereof, an adjusting screw disposed between said links for varying the angle therebetween uniformly with respect to a bisecting line passing through the axis of the drum and between said links, a tip carrier pivotally mounted on each link, an adjusting screw extending between each carrier and its associated link whereby said tips may be asymmetrically adjusted with respect to said line, and tips secured to each carrier and so disposed with respect thereto as to lie in a common plane including said bisecting axial line.

14. Torch hardening apparatus comprising a saddle, a base plate disposed on the saddle, a pivot stud connecting the saddle and plate for pivotal movement of the plate about a vertical axis taken through the stud, a pair of standards disposed on the base, a block extending between and slidably mounted on said standards, a screw disposed on the base in parallel relation to said standards, said block being formed with a nut receiving said screw whereby said block may be lineally adjusted along the standards, a bearing boss formed in the block, the axis of said boss being disposed in a horizontal plane and intersecting said vertical axis, a slide formed with a hub journaled in said boss for rotary movement about said horizontal axis, said slide being formed with a worm wheel, a cooperating worm journaled on said boss whereby operation of the worm varies the inclination of said slide, a torch carrier mounted on said slide for lineal adjustment with respect thereto, said carrier being formed with a cylindrical socket whose center coincides with the point of intersection of said axes, an elongated torch formed with a cylindrical drum portion mounted in said socket concentrically therewith, whereby a plane disposed longitudinally of said torch and through the center of said drum will pass through said point, and a pair of spaced tips connected to said torch at a point remote from said drum, said tips lying in said last named plane.

15. Torch hardening apparatus comprising an elongated torch body formed adjacent one end with a cylindrical drum, means for engaging said drum on the exterior thereof for adjustably mounting the torch for rotation about the longitudinal axis of the drum, an extension pipe connected to one end of the drum, a pair of links pivotally connected to said pipe at the remote end thereof, means extending between said links and the end of said pipe to vary the angular spacing between said links symmetrically with respect to said longitudinal axis, a tip carrier pivotally mounted on the opposite end of each link, a connecting screw disposed between each carrier and its associated link for asymmetrically varying the inclination of each carrier with respect to said axis, a tip connected to each carrier, and fuel lines extending through said drum to said tip through said carrier.

WILLIAM E. SYKES.